United States Patent
Quintana

[19]

[11] Patent Number: 6,032,696
[45] Date of Patent: Mar. 7, 2000

[54] BOTTOM NOZZLE REPAIR APPARATUS

[75] Inventor: Keith A. Quintana, Fairport, N.Y.

[73] Assignee: Pfaudler, Inc., Rochester, N.Y.

[21] Appl. No.: 09/220,479

[22] Filed: Dec. 23, 1998

[51] Int. Cl.$^7$ ...................................................... F16L 55/10
[52] U.S. Cl. ................................ 138/94; 138/97; 138/98; 220/234; 29/402.15; 137/315
[58] Field of Search .................................. 138/97, 98, 94; 220/234, 200, 378; 29/402.11, 402.12, 402.15; 137/315

[56] References Cited

U.S. PATENT DOCUMENTS

| | | | |
|---|---|---|---|
| 172,528 | 1/1876 | Walker ..................................... | 220/234 |
| 3,236,407 | 2/1966 | Zelman et al. ........................... | 220/220 |
| 4,078,697 | 3/1978 | Schlosberg et al. .................... | 220/378 |
| 4,497,418 | 2/1985 | Nunlist .................................... | 220/234 |
| 5,556,113 | 9/1996 | Amorese et al. ........................ | 277/233 |

OTHER PUBLICATIONS

Bulletin SP–1A Sep. 1991 of Spectrum Products, Inc.

*Primary Examiner*—Patrick Brinson
*Attorney, Agent, or Firm*—Michael L. Dunn

[57] ABSTRACT

Apparatus for repairing a breach in a lower nozzle of a glass lined vessel which includes an internal flange having an upper surface, a lower surface, an outside end surface and an inside end surface. The apparatus further includes an insert tube having an outside diameter sized to permit insertion through the nozzle and of sufficient length to extend completely through the nozzle and extend beyond a lowermost portion of the nozzle. The insert tube has an inside surface, and an external surface having an upper end portion. The upper end portion of the external surface of the insert tube is in contact with and integral with the inside end surface of the internal flange. The insert tube is usually welded to the internal flange at that location. The external surface of the insert tube is threaded below the lowermost portion of the nozzle. The apparatus of the invention also includes a liner of corrosion resistant metal, e.g. tantalum, covering the inside surface of the insert tube, the upper surface of the internal flange, the outside end surface of the internal flange and at least a portion of the lower surface of the inside flange. A thrust plate flange is provided that is threadable over the external surface of the insert tube below the lowermost portion of the nozzle. The thrust plate flange is provided with threaded bolt holes. Bolts are provided for threading into the bolt holes for forcing the thrust plate flange in a direction away from the lowermost portion of the nozzle thus forcing said insert tube and attached internal flange in a direction which causes the tantalum lined lower surface of the internal flange and the corrosion resistant lining of the vessel to seal against an internal flange gasket located between said lower surface of the internal flange and the corrosion resistant lining of the vessel.

8 Claims, 1 Drawing Sheet

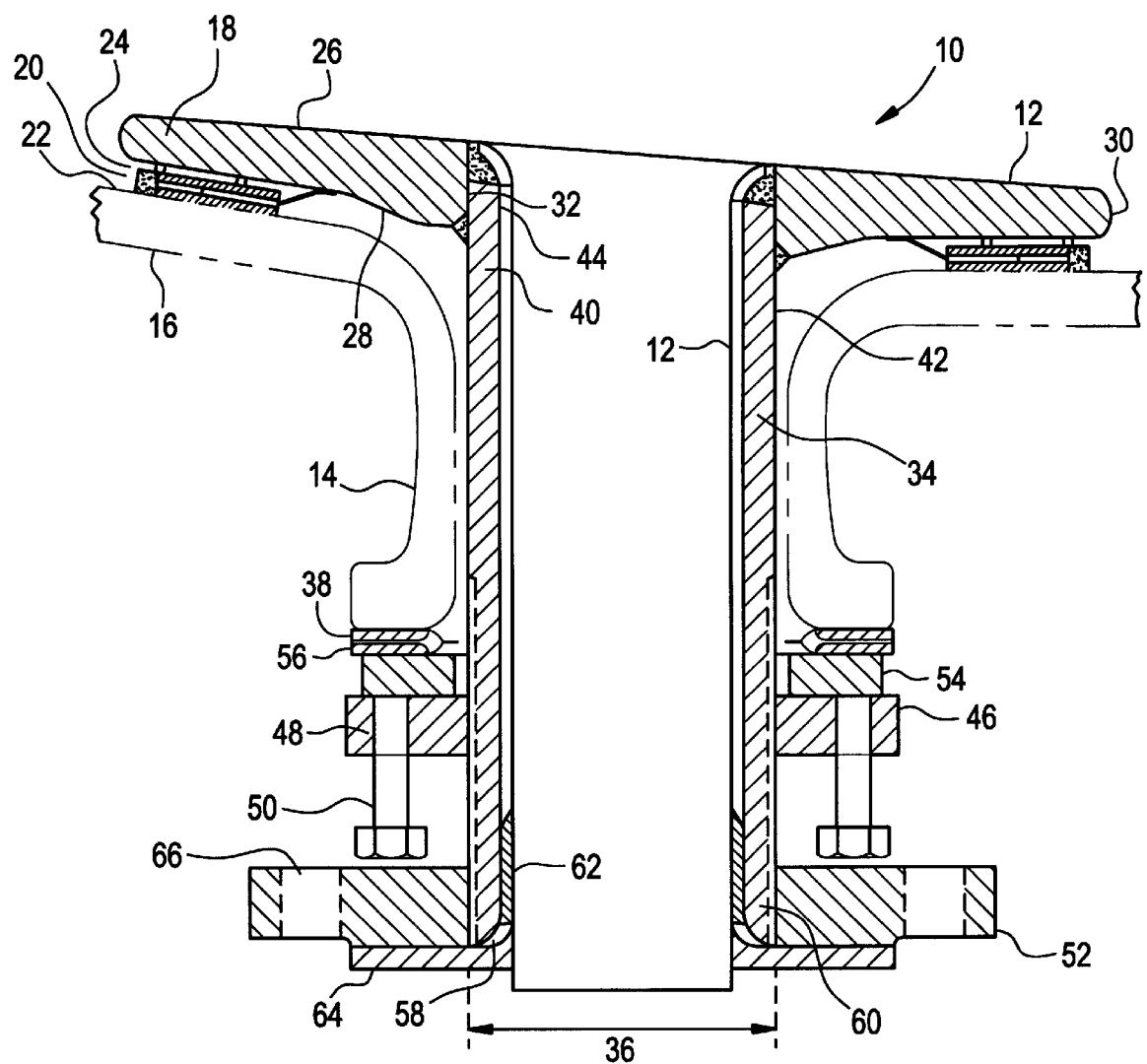

BOTTOM NOZZLE REPAIR APPARATUS

BACKGROUND OF THE INVENTION

Vessels having corrosion resistant liners are well known for the purpose of reacting, processing and storing liquids having corrosive properties. Similar vessels are known for the purpose of preventing contamination of a vessel's contents by material leached from or adhering to corrosion prone materials.

Glass lined vessels are among the best of such corrosion and contamination resistant vessels. Glass linings are inert to most materials and may be manufactured to have very smooth surfaces to which contaminates either do not adhere or from which contaminates are easily removed.

Such glass lined vessels, unfortunately, do have disadvantages. In particular, glass lining of vessels, e.g. steel vessels, must be done with particular care to avoid stress cracks and to obtain desirable adherence. In addition, such glassing operations require high temperature furnaces. Glassing of vessels is thus relatively costly. Further, glass linings are brittle and thus may be subject to breach through both thermal and impact shock. This often occurs at the bottom nozzle of a vessel where there may be tight curves subject to thermal and expansion stress and where the vessel is subject to more physical contact than other parts of the vessel.

Once the lining is breached the only options to maintain corrosion resistance are temporary repairs to cover the area of the breach or reglassing which requires return of the vessel to the glassing factory.

Up to the time of the present invention, temporary repairs were not as good as desired for several reasons. A tight seal between undamaged glass lining and the repair must be obtained. This was not always effective or possible. There are a limited number of materials having sufficient corrosion and temperature resistance to make a good repair. Among these are certain fluoropolymers, e.g. polytetrafluoroethylene and certain exotic metals, e.g. tantalum. An example of such a repair is disclosed in bulletin SP-1A 9/91 of Spectrum Products, Inc. Unfortunately, the use of fluoropolymers, while being relatively inexpensive, does not permit repairs to be made that are as good as the original glass surface. Fluoropolymers, while having reasonably good temperature resistance, do not have nearly the temperature resistance of glass. Also, fluoropolymers do not have corrosion resistance as good as glass. In particular such polymers are subject to degradation by nascent halogens, e.g. chlorine, bromine and iodine.

It would therefore seem that the best option for such a "temporary" repair is an exotic metal such as tantalum. It is true that tantalum has a higher temperature resistance than fluoropolymers and have better resistance to halogens than fluoropolymers. Unfortunately, such metals are exceedingly costly and difficult to process especially in temporary repairs that must be discarded when the repair is removed for replacement of sealing gaskets or to permit reglassing.

BRIEF DESCRIPTION OF THE INVENTION

In accordance with the invention, there is therefore provided a repair assembly for bottom nozzles of glass lined vessels that overcomes the disadvantages discussed above.

The repair apparatus uses a corrosion resistant transition metal. The metal is preferably tantalum. The repair is uniquely effected and even more uniquely permits the repair apparatus to be reused thus making the use of the corrosion resistant transition metal cost effective.

The apparatus is for repair of a bottom opening nozzle of a vessel having a corrosion resistant lining, wherein the vessel has a breached corrosion resistant lining in the area of the nozzle.

More particularly, the apparatus comprises an internal flange having an upper surface, a lower surface, an outside end surface and an inside end surface. The apparatus further comprises an insert tube having an outside diameter sized to permit insertion through the nozzle and of sufficient length to extend completely through the nozzle and extend beyond a lowermost portion of the nozzle. The insert tube has an inside surface, and an external surface having an upper end portion. The upper end portion of the external surface of the insert tube is in contact with and integral with the inside end surface of the internal flange. The insert tube is usually welded to the internal flange at that location. The external surface of the insert tube is threaded below the lowermost portion of the nozzle.

The apparatus of the invention also includes a liner of corrosion resistant metal, e.g. tantalum, covering the inside surface of the insert tube, the upper surface of the internal flange, the outside end surface of the internal flange and at least a portion of the lower surface of the inside flange.

A thrust plate flange is provided that is threadable over the external surface of the insert tube below the lowermost portion of the nozzle. The thrust plate flange is provided with threaded bolt holes. Bolts are provided for threading into the bolt holes for forcing the thrust plate flange in a direction away from the lowermost portion of the nozzle thus forcing said insert tube and attached internal flange in a direction which causes the tantalum lined lower surface of the internal flange and the corrosion resistant lining of the vessel to seal against an internal flange gasket located between said lower surface of the internal flange and the corrosion resistant lining of the vessel.

The apparatus may also be provided with a flange nut for threading onto the external surface of the insert tube below the pressure plate ring for attachment to apparatus for carrying fluid from below the nozzle.

The apparatus may further comprises a pressure plate ring for passage over the external surface of the insert tube below the lowermost portion of the nozzle prior to threading of the thrust plate flange over the external surface of the insert tube. The bolts may then apply pressure to the pressure plate ring that is in turn forced in a direction toward the lowermost portion of the nozzle.

The gasket between the tantalum lined lower surface of the internal flange and the corrosion resistant lining of the vessel may comprise a reinforced resilient layer and an O-ring enveloped in a fluorocarbon shield layer, e.g. as described in U.S. Pat. No. 5,556,113. Such a gasket is very beneficial in obtaining a tight pressure resistant seal. A gasket is also desirably provided between the pressure plate ring and the lowermost portion of the nozzle.

To prevent corrosive or other undesirable substances from attacking the flange nut or the internal surface of the insert tube behind the tantalum liner, a tantalum shield is desirably provided over a lower surface of the flange nut and between the internal surface of the insert tube and the tantalum liner in a lower part of the insert tube. Corrosion resistant packing is provided between the tantalum shield and the tantalum liner to isolate any space between the liner and the internal surface of the insert tube. To retain the packing, a packing follower gasket may be placed over the external surface of the insert tube.

DETAILED DESCRIPTION OF THE INVENTION

"Repair" as used herein means to cover a glass lined area, where there is a breach in the liner, so that the vessel may be returned to service.

"Assembly" means a series of separate parts that are assembled for the purpose of making a repair.

"Bottom nozzle" means a lower exit portion of a glass lined vessel. The lower exit portion is usually provided with a glass lined flange.

As can be seen in the drawing which shows a preferred embodiment of the invention, the repair apparatus 10 uses a corrosion resistant transition metal, e.g. vanadium, niobium, palladium, hafnium, tantalum, iridium or platinum, liner 12 in an effective repair of the bottom nozzle 14 of a glass lined vessel 16. The metal is preferably tantalum. The repair is uniquely effected and even more uniquely permits the repair apparatus 10 to be reused thus making the use of the corrosion resistant transition metal cost effective.

An internal flange 18 fits inside the vessel 16 to form a seal 20 with the internal surface 22 of the vessel 16 in conjunction with an internal flange gasket 24. The internal flange 18 has an upper surface 26, a lower surface 28, an outside end surface 30 and an inside end surface 32. The apparatus 10 further comprises an insert tube 34 having an outside diameter 36 sized to permit insertion through the nozzle and of sufficient length to extend completely through the nozzle and extend beyond a lowermost portion 38 of the nozzle 14. The insert tube 34 has an inside surface 40, and an external surface 42 having an upper end portion 44. The upper end portion 44 of the external surface 42 of the insert tube is in contact with and integral with the inside end surface 32 of the internal flange 18. The insert tube 34 is usually welded to the internal flange 18 at that location. The external surface 42 of the insert tube 34 is threaded below the lowermost portion 38 of the nozzle 14.

The apparatus of the invention also includes a liner 12 of corrosion resistant metal, e.g. tantalum, covering the inside surface 40 of the insert tube 34, the upper surface 26 of the internal flange 18, the outside end surface 30 of the internal flange and at least a portion of the lower surface 28 of the inside flange.

A thrust plate flange 46 is provided that is threadable over the external surface 42 of the insert tube 34 below the lowermost portion 38 of the nozzle 14. The thrust plate flange 46 is provided with threaded bolt holes 48. Bolts 50 are provided for threading into the bolt holes 48 for forcing the thrust plate flange 46 in a direction away from the lowermost 38 of the nozzle 14 thus forcing said insert 34 and attached internal flange 18 in a direction which causes the tantalum lined lower surface 28 of the internal flange 18 and the corrosion resistant lining of the vessel 16 to seal against an internal flange gasket 24 located between said lower surface 28 of the internal flange 18 and the corrosion resistant lining of the vessel 16.

The apparatus 10 may also be provided with a flange nut 52 for threading onto the external surface 42 of the insert tube 34 below the thrust plate flange 46 for attachment to apparatus for carrying fluid from below the nozzle 14.

The apparatus 10 may further comprises a pressure plate ring 54 for passage over the external surface 42 of the insert tube 34 below the lowermost portion 38 of the bottom nozzle 14 prior to threading of the thrust plate flange 46 over external surface 42. The bolts 50 may then apply pressure to the pressure plate ring 54 that is in turn forced in a direction toward the lowermost portion of the nozzle.

The gasket 24 between the tantalum lined lower surface 28 of the internal flange 18 and the corrosion resistant lining of the vessel 16 may comprise a reinforced resilient layer and an O-ring enveloped in a fluorocarbon shield layer, e.g. as described in U.S. Pat. No. 5,556,113. Such a gasket 24 is very beneficial in obtaining a tight pressure resistant seal. A gasket 56 is also desirably provided between the pressure plate ring 54 and the lowermost portion 38 of the bottom nozzle 14.

To prevent corrosive or other undesirable substances from attacking the flange nut 52, thrust plate flange 46, the pressure plate ring 54 or the internal surface 40 of the insert tube 34 behind the tantalum liner 12, a tantalum shield 58 is desirably provided over a lower surface of the flange nut 52 and between the internal surface 40 of the insert 34 and the tantalum liner 12 in a lower part of the insert tube 34. Corrosion resistant packing 62 is provided between the tantalum shield 58 and the tantalum liner 12 to isolate any space between the liner 12 and the internal surface 40 of the insert tube 34. To retain the packing 62, a packing follower gasket 64 may be placed over the external surface 42 of the insert tube 34.

From the above description, it can be readily seen that the apparatus 10 is easily installed by placing the insert tube 34 with attached internal flange 18 and liner 12 through gasket 24 and bottom nozzle 14 from the inside of the vessel 16 outwards. Gasket 56 is then placed over the protruding end of the insert tube, followed by the pressure plate ring 54 and thrust plate flange 46. Bolts 50 are then screwed through bolt holes 48 to apply pressure against pressure plate ring 54 thus causing internal flange lower surface 28 to press against gasket 24 which in turn presses on the lining of vessel 16 to form a seal. Flange nut 52 is the screwed onto the external surface 42 of insert tube 34. Tantalum shield 58 is then placed over flange nut 52 and into insert tube 34 beneath liner 12. Packing 62 is then forced between liner 12 and shield 58. Follower gasket 64 is then applied to hold packing 62. Follower gasket 64 is held by a continuation flange, not shown, attached to flange nut 52 by means of bolts through holes 66 in flange nut 52.

It can be seen that the apparatus can be readily disassembled by reversing the above steps.

What is claimed is:

1. A repair apparatus for a bottom opening nozzle of a vessel having a corrosion resistant lining, wherein the vessel has a breached corrosion resistant lining in the area of the nozzle, said repair apparatus comprising:

an internal flange having an upper surface, a lower surface, an outside end surface and an inside end surface;

an insert tube having an outside diameter sized to permit insertion through the nozzle and of sufficient length to extend completely through the nozzle and extend beyond a lowermost portion of the nozzle, said insert tube having an inside surface, and an external surface having an upper end portion, said upper end portion of the external surface being in contact with and integral with the inside end surface of the internal flange, the external surface of the insert tube being threaded below the lowermost portion of the nozzle;

a tantalum liner covering said inside surface of the insert tube, the upper surface of the internal flange, the outside end surface of the internal flange and at least a portion of the lower surface of the inside flange;

a thrust plate flange threadable over the external surface of the insert tube below the lowermost portion of the nozzle, said thrust plate flange being provided with threaded bolt holes; and bolts for threading into said bolt holes for forcing said thrust plate flange in a direction away from the lowermost portion of said nozzle thus forcing said insert tube and attached internal flange in a direction which causes the tantalum lined lower surface of the internal flange and the corrosion resistant lining of the vessel to seal against an internal flange gasket located between said lower surface of the internal flange and the corrosion resistant lining of the vessel.

2. The apparatus of claim 1 wherein a flange nut is provided for threading onto the external surface of the insert tube below said pressure plate ring for attachment to apparatus for carrying fluid from below said nozzle.

3. The apparatus of claim 1 which further comprises a pressure plate ring for passage over the external surface of the insert tube below the lowermost portion of the nozzle prior to threading of the thrust plate flange over the external surface of the insert tube, said bolts applying pressure to said pressure plate ring that is in turn forced in a direction toward the lowermost portion of said nozzle.

4. The apparatus of claim 1 wherein the gasket between the tantalum lined lower surface of the internal flange and the corrosion resistant lining of the vessel comprises a reinforced resilient layer and an O-ring enveloped in a fluorocarbon shield layer.

5. The apparatus of claim 3 wherein a lower nozzle gasket is provided between the pressure plate ring and the lowermost portion of said nozzle.

6. The apparatus of claim 2 wherein a tantalum shield is provided over a lower surface of the flange nut and between the internal surface of the insert tube and the tantalum liner in a lower part of the insert tube and corrosion resistant packing is provided between the tantalum shield and the tantalum liner.

7. The apparatus of claim 6 wherein a packing follower gasket is placed over the external surface of the insert tube.

8. The apparatus of claim 1 wherein the tantalum liner at the lower surface of the inside flange is provided with sealing protrusions for sealing against the internal flange gasket.

* * * * *